E. A. KERSTEIN.
GAS METER.
APPLICATION FILED FEB. 27, 1919.
1,385,253.
Patented July 19, 1921.
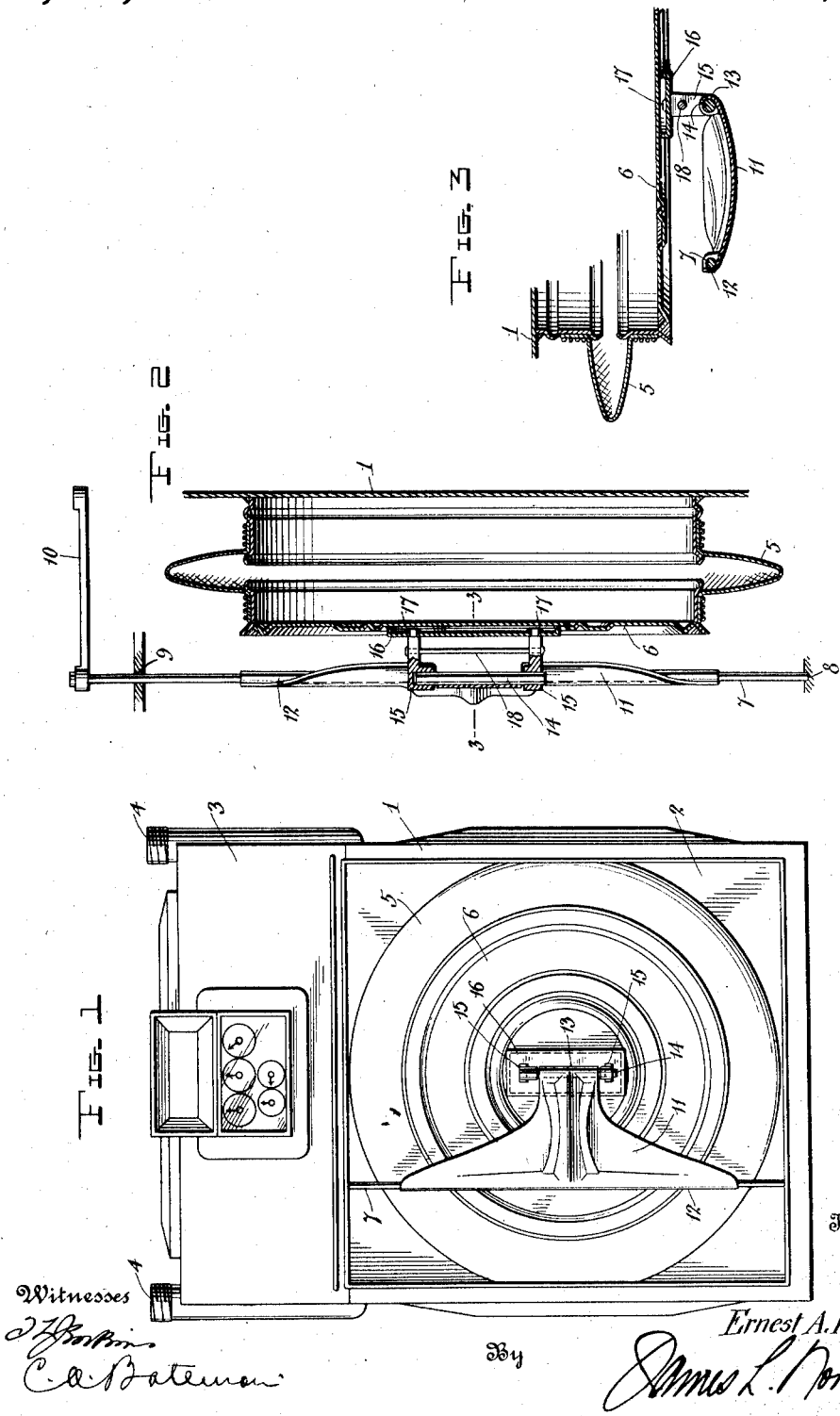
Witnesses
Inventor
Ernest A. Kerstein,
By
Attorney

UNITED STATES PATENT OFFICE.

ERNEST A. KERSTEIN, OF UNION, NEW JERSEY, ASSIGNOR TO AMERICAN METER COMPANY, OF NEW YORK, N. Y., A CORPORATION OF DELAWARE.

GAS-METER.

1,385,253.  Specification of Letters Patent.  Patented July 19, 1921.

Application filed February 27, 1919. Serial No. 279,508.

*To all whom it may concern:*

Be it known that I, ERNEST A. KERSTEIN, a citizen of the United States, residing at town of Union, in the county of Hudson and State of New Jersey, have invented new and useful Improvements in Gas-Meters, of which the following is a specification.

My present invention relates to improvements in gas meters and particularly to those of the so called "dry" type employing bellows adapted to be alternately filled and emptied of gas and coöperative registering mechanism actuated by the bellows to indicate the amount of gas that has passed through and been measured by the bellows.

In meters of this type as generally constructed, the bellows comprise a metal disk and a flexible diaphragm attached to the edge thereof and heretofore it has been the practice to connect the disk of the bellows to the registering mechanism by pivot or gearage posts which were soldered directly to the disk. In consequence, when it became necessary to detach the pivot or gearage posts from the disk for the purpose of removing or renewing the flexible diaphragm, such posts which are composed of white metal of a low melting point were frequently melted and thus rendered useless.

It is the object of the present invention to provide improved means for attaching the pivot or gearage posts to the disk of the bellows whereby the operations of attaching and removing these posts may be accomplished with facility and melting of or injury to the posts is avoided, this being accomplished, according to the present invention, by soldering or otherwise permanently attaching the pivot or gearage posts to a metal base plate, and soldering the base plate to the disk, the operations of soldering and unsoldering the base plate with respect to the disk being capable of performance without liability of melting or otherwise injuring the gearage posts, although these posts may, as heretofore, be composed of white metal having a low melting point.

To these and other ends, the invention consists in certain improvements and combinations and arrangements of parts, all as will be hereinafter more fully described, the features of novelty being pointed out more particularly in the claims at the end of this specification.

In the accompanying drawing:—

Figure 1 is a front elevation of a gas meter of the "dry" type embodying the improved gearage post mounting of the present invention, the front wall of the meter casing being removed to expose the interior thereof.

Fig. 2 represents, on an enlarged scale, a section taken vertically and centrally through the bellows, and Fig. 3 represents a section taken on the line 3—3 of Fig. 2.

Similar parts are indicated by the same reference characters in the several views.

The preferred embodiment of the invention is shown in the present instance applied to a well known form of gas meter of the dry type, but it is to be understood that the invention is not restricted to the precise construction shown, as equivalent constructions are contemplated and will be included within the scope of the claims, and moreover, the improvement may be applied to other forms of meters embodying gearing posts of the character herein referred to.

In the present instance 1 designates the casing of a gas meter of the dry type, this casing inclosing the various parts of the meter, the casing providing a lower compartment 2 adapted to contain the measuring bellows, and an upper compartment 3 adapted to contain the registering mechanism. Usually two bellows are used, they being located at the front and back respectively of the casing. These bellows are or may be duplicates and hence illustration and description of one will be sufficient for both, it being understood by those skilled in this art that the bellows are alternately filled with gas coming into the meter through one of the connections 4 and they discharge such gas through the other connection 4, the bellows expanding and collapsing under the control of appropriate valves.

Each bellows comprises a flexible diaphragm 5 of leather or other suitable material and a metal disk 6, the edges of which are fixed to and have a gas-tight fit with the diaphragm, the disk having a to-and-fro motion transversely of its plane during the expansion and collapsing of the bellows. A vertical shaft 7 is used to transmit the movements of the disk 6 to the registering mechanism, this shaft being mounted to rotate in suitable bearings 8 and 9 and being provided at its upper end with a lever 10 by which it is operatively connected to the registering mechanism. The shaft 7 is operatively connected to the disk 6 of the bellows by a rigid plate 11, the edge 12 of which is fixed, preferably by soldering, to the shaft 7 and the opposite edge 13 of which is fixed, preferably by soldering, to a pivot pin 14, this pivot pin rotatably fitting in bearings provided on the outer ends of a pair of pivot or gearage posts 15.

Instead of soldering these gearage posts 15 directly to the disk 6, as heretofore, these posts, according to the present invention, are permanently fixed to a base plate 16. Preferably, and as shown, the attached ends of the posts are reduced and passed through openings in the base plate, after which these ends of the gearage posts are soldered to the base plate at the points 17 in rear of the said plate and they may also be soldered to this plate at the front. A rod 18 preferably connects the gearage posts to maintain them at the proper distance and in alinement. The base plate 16, which is of suitable metal, preferably tinned iron, is, in turn, soldered to the face of the metal disk 6 of the bellows, this base plate being preferably provided with peripheral, rearwardly-turned flanges which have edgewise engagement with the face of the disk, and capable of being easily soldered to and unsoldered from the disk. By this construction, the gearage posts, which are composed of white metal having a relatively low melting point, remain permanently soldered to the base plate and hence there is no danger of melting and thereby ruining them when they are detached from the disk 6, such detachment becoming necessary when removal or replacement of the diaphragm 5 is required.

I claim as my invention:—

1. In a meter having bellows embodying a flexible diaphragm and a metal disk attached thereto and presenting a flat face, and gearage for operating the registering mechanism, means for attaching such gearage to said disk comprising gearage posts, and a base plate having openings through which said posts extend and are secured to the base plate at the rear thereof, said base plate having an edge which is turned toward and is soldered edgewise to the flat face of said disk.

2. In a meter of the type embodying bellows having a flexible diaphragm and a metal disk attached thereto and presenting a flat face, and mechanism including gearage posts for actuating the registering mechanism of the meter, means for attaching said gearage posts to said disk comprising a base plate having openings through which said posts extend and are soldered thereto at one side, the posts projecting from the opposite side, the base plate having peripheral flanges directed toward and soldered edgewise to the flat face of said disk.

3. In a meter of the type embodying bellows having a flexible diaphragm and a metal disk attached thereto and having a flat face, and means including gearage posts for actuating the registering mechanism of the meter, means for attaching said posts to said disk comprising an elongated metal base plate having openings through which said posts extend and are soldered thereto at its rear side and toward its opposite ends and projecting from its forward side, said plate having flanges projecting from its rear side which engage and are soldered edgewise to the flat face of said disk, said base plate extending diametrically across the flat face of said disk.

In testimony whereof I have hereunto set my hand in presence of two subscribing witnesses.

ERNEST A. KERSTEIN.

Witnesses:
JAS. F. LEDDY,
A. NEWMAN.